United States Patent
Yabui et al.

(10) Patent No.: US 6,797,386 B2
(45) Date of Patent: Sep. 28, 2004

US006797386B2

(54) COATED MOLDING OF THERMOPLASTIC RESIN COMPOSITION AND PRODUCTION METHOD THEREFOR

(75) Inventors: Akihiro Yabui, Ohtake (JP); Yoshihiro Ohtsuka, Ohtake (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/260,524

(22) Filed: Oct. 1, 2002

(65) Prior Publication Data

US 2003/0091828 A1 May 15, 2003

Related U.S. Application Data

(63) Continuation-in-part of application No. 09/860,465, filed on May 21, 2001, now abandoned.

(30) Foreign Application Priority Data

May 23, 2000 (JP) ........................................ 2000-151339

(51) Int. Cl.[7] ........................ B32B 27/30; B32B 27/32; B32B 27/38; B32B 27/40; B32B 31/24
(52) U.S. Cl. .................... 428/413; 428/420; 428/423.1; 428/521; 428/523; 427/299; 427/322
(58) Field of Search ................................ 428/413, 420, 428/423.1, 521, 523; 427/299, 322; 525/88, 95, 98, 107, 122, 404

(56) References Cited

U.S. PATENT DOCUMENTS

| | | | |
|---|---|---|---|
| 4,465,715 A | | 8/1984 | Manabe |
| 5,139,817 A | * | 8/1992 | Abe et al. .................... 427/558 |
| 5,185,188 A | | 2/1993 | Abe et al. |
| 5,256,734 A | * | 10/1993 | Sugihara et al. ............... 525/98 |
| 6,323,251 B1 | | 11/2001 | Perez et al. |
| 2003/0096882 A1 | * | 5/2003 | Fujita ........................... 521/48 |
| 2003/0125464 A1 | * | 7/2003 | Yabui .......................... 525/122 |

FOREIGN PATENT DOCUMENTS

| | | |
|---|---|---|
| JP | 3-157168 | 7/1991 |
| JP | 5-39383 | 2/1993 |
| JP | 6-157838 | 6/1994 |

OTHER PUBLICATIONS

Machine translation of JP–08–109293, Otsuka Yoshihiro, provided by JPO website.*
Patent Abstracts of Japan, Publication No. 08–176384, Jul. 9, 1996.
Patent Abstracts of Japan, Publication No. 08–109293, Apr. 30, 1999.

* cited by examiner

*Primary Examiner*—Philip C. Tucker
*Assistant Examiner*—Michael J Feely
(74) *Attorney, Agent, or Firm*—Nixon & Vanderhye P.C.

(57) ABSTRACT

A coated molding comprising a molding of a thermoplastic resin composition including a thermoplastic resin and an epoxidized diene based block copolymer, and a coating layer formed on a surface of the molding, the thermoplastic resin composition including a thermoplastic resin and an epoxidized diene based block copolymer obtained by epoxidizing a diene based block copolymer or a partially hydrogenated diene based block copolymer, wherein prior to epoxidizing, the diene based block copolymer or partially hydrogenated diene based block copolymer consists of a polymer block consisting of a vinyl aromatic hydrocarbon compound, and a polymer block consisting of a conjugate diene compound or a partially hydrogenated conjugate diene compound. The thus obtained coating layer is thereby firmly adhered to a molding of the thermoplastic resin composition.

7 Claims, No Drawings

COATED MOLDING OF THERMOPLASTIC RESIN COMPOSITION AND PRODUCTION METHOD THEREFOR

This application is a continuation-in-part of Application Ser. No. 09/860,465, filed May 21, 2001 (now abandoned), the entire content of which is hereby incorporated by reference in this application.

BACKGROUND OF THE INVENTION

1. Field of the Invention

The present invention relates to a coated molding comprising a thermoplastic resin composition molding with excellent coating properties including a thermoplastic resin and a compound having a functional group, and a coating layer on the surface of the thermoplastic resin composition molding, and to a production method therefor. The coated molding is suitable for industrial materials such as automobile parts, household electric appliance parts, electrical equipment parts, and other commodities.

2. Description of the Related Art

Thermoplastic resins such as a polypropylene resin are light-weight, and have excellent stiffness, hardness, and heat resistance. Also, they are inexpensive and can be easily molded into a desired shape with various molding methods such as injection molding, calender molding, and extrusion molding. Accordingly, they have been widely used for automotive interiors including instrument panels, trims, and pillars, automotive exteriors including fenders, bumpers, side molding, mud guards, and mirror covers, other automobile parts, household electric appliance parts, industrial parts, and other commodities. However, a polyolefin based resin generally has problems with coating properties, coating film adhesive properties, and adhesive properties with a coating agent, which are required to be improved.

Typically, a polyolefin based resin such as a polypropylene resin are coated after a surface treatment.

The surface treatment prior to coating is for degreasing or polarizing the surface of a non-polar polyolefin based resin molding. Specifically, the non-polar polyolefin based resin is surface-treated with a halogenated hydrocarbon such as trichloroethane, is oxidized or polarized with a corona discharge, a plasma jet and the like, and is then coated.

Another means for providing the coating properties is to add a very low molecular weight ethylene propylene rubber (EPR) to the non-polar polyolefin based resin composition. Japanese Unexamined Patent Application Publication Hei.6-157838 proposes that modified polyolefin with a compound having a polar group is added to the non-polar polyolefin based resin composition. Japanese Unexamined Patent Application Publication Hei.5-39383 proposes that a modified polyolefin with a compound having an unsaturated hydroxyl group is added to a non-polar polyolefin based resin composition. Japanese Unexamined Patent Application Publication Hei.3-157168 proposes that an oligomer having a polar end group is added to a non-polar polyolefin based resin composition.

However, in these methods, a large amount of very low molecular weight EPR or chemically modified compounds are required to provide sufficient coating properties.

An object of the present invention is to provide a coated molding where a firmly adhered coating layer is formed on the surface of a thermoplastic resin composition molding without performing a complex surface treatment.

SUMMARY OF THE INVENTION

According to the present invention, a molding of a thermoplastic resin composition may be obtained by adding a compound having a functional group such as an epoxidized diene based block copolymer to a thermoplastic resin such as a polypropylene based resin, a coating layer can be formed with an ultraviolet curable urethane acrylate coating agent, and firmly adhered to the molding without a special surface treatment such as a corona discharge treatment.

According to the first aspect of the present invention, a coated molding comprising a molding (M) of a thermoplastic resin composition (A) including a thermoplastic resin (a1) and a compound (a2) having a functional group, and a coating layer (B) formed on the surface of the molding (M) is provided.

According to the second aspect of the present invention, the compound (a2) has an epoxy group.

According to the third aspect of the present invention, the compound (a2) having the epoxy group is an epoxidized diene based block copolymer obtained by epoxidizing a diene based block copolymer or a partially hydrogentated diene based block copolymer, wherein prior to epoxidizing, the diene based block copolymer or partially hydrogenated diene based block copolymers consists of a polymer block consisting of a vinyl aromatic hydrocarbon compound, and a polymer block consisting of a conjugate diene compound, or a partially hydrogenated conjugate diene compound.

According to the fourth aspect of the present invention, the coating layer (B) is formed by an ultraviolet curable urethane acrylate based coating agent.

According to the fifth aspect of the present invention, the thermoplastic resin composition (A) comprises 85% to 97% by weight of the thermoplastic resin (a1) and 15% to 3% by weight of the compound (a2) having the functional group.

According to the sixth aspect of the present invention, the thermoplastic resin (a1) is a polyolefin based resin.

According to the seventh aspect of the present invention, the polyolefin based resin is a polypropylene based resin and/or a polyethylene based resin.

According to the eighth aspect of the present invention, a method for producing the above-mentioned coated molding comprises the steps of coating a surface of the molding (M) with the coating agent (b), and reacting the compound (a2) with the coating agent (b) to form the coating layer (B) thereon.

According to the ninth aspect of the present invention, the coating agent (b) is coated after the surface of the molding is treated with a hydrophobic solvent.

According to the tenth aspect of the present invention, the hydrophobic solvent is one or more selected from the group consisting of xylene, cyclohexane, and toluene.

DESCRIPTION OF THE PREFERRED EMBODIMENTS

The present invention will be described below with more detail.

Thermoplastic Resin (a1)

The percentage of thermoplastic resin (a1) for use in the present invention is 85% to 97% by weight, preferably 85% to 95% by weight based on the total weight of the thermoplastic resin composition (A).

Any known thermoplastic resin can be used as the thermoplastic resin (a1) for use in the present invention. Examples of the preferred thermoplastic resin include, but are not limited to, general-purpose thermoplastic resins such as an ABS resin, an impact resistant polystyrene resin, a polycarbonate resin, a polymethylmethacrylate resin, a polyolefin based resin, a saturated polyester resin, a polyamide resin, a polyvinyl chloride resin, a polyacetal resin, and a polyphenylene oxide based resin; engineering plastics; and a mixture thereof. More preferred is the polyolefin based resin such as polypropylene and polyethylene. The production method for these thermoplastic resins is not especially limited.

The polyolefin based resin may be a homopolymer of an α-olefine based monomer, or a copolymer of two or more of the α-olefine based monomers. Specific examples include a polyethylene based polymer such as a very low density-, low density-, medium density-, and high density-polyethylene, a polypropylene based copolymer, polybutene-1, and poly4-methylpentene. The polypropylene based resin has high modifying properties, and therefore is preferred.

The polypropylene based resin may be crystalline or amorphous, preferably crystalline, and may be a propylene homopolymer or a copolymer of propylene and another α-olefine. The copolymer may be a block copolymer or a random copolymer. Preferred is the propylene homopolymer and/or the propylene block copolymer. Most preferred is a propylene/ethylene block copolymer.

The propylene/ethylene block copolymer contains 0.5 to 8 mol %, preferably 1 to 7 mol % of an ethylene derived unit. The content of the ethylene in the propylene block copolymer is simply referred to as the ethylene content.

The ethylene content can be determined using $^{13}$C-NMR with a normal procedure. Crystallinity of such crystalline polypropylene measured by an X-ray diffraction method is generally 56% or more, preferably 60% or more, more preferably 65% to 95%. The crystal may have an isotactic, or syndiotactic structure.

Compound (a2) Having the Functional Group

A percentage of the compound (a2) having the functional group for use in the present invention is 3% to 15% by weight, preferably 5% to 15% by weight based on the total weight of the thermoplastic resin composition (A). When the percentage is less than the above range, an improved adhesion of the coating layer to the molding is insufficient, and when the percentage is more than the above range, appearance of the molding is not good.

As the compound (a2) having the functional group, any compound having the functional group capable of reacting with the coating agent can be used with no limitation. Specific examples of the functional group include an epoxy group, an acid anhydride group, an isocyanate group, an amino group, a hydroxyl group, a melamine group, a cyclic lactone group, and carboxylic group. Preferred compound (a2) has an epoxy group. Specific examples of a compound having an epoxy group include an epoxidized diene based block copolymer, a glycidylester type epoxy compound, a glycidylamine type epoxy compound, a cyclic aliphatic epoxy compound, and a heterocyclic epoxy compound. Preferred is the epoxidized diene based block copolymer.

Epoxidized Diene Based Block Copolymer

The epoxidized diene based block copolymer for use in the present invention is obtained by epoxidizing a diene based block copolymer or a partially hydrogenated diene based block copolymer.

The diene based block copolymer herein described is the block copolymer obtained by epoxidizing a diene based block copolymer or a partially hydrogentated diene based block copolymer, wherein prior to epoxidizing, the diene based block copolymer or partially hydrogenated diene based block copolymer consists of a polymer block consisting of a vinyl aromatic hydrocarbon compound, and a polymer block consisting of a conjugate diene compound or a partially hydrogenated conjugate diene compound. The weight ratio of the vinyl aromatic compound and the conjugate diene compound, i.e. the weight ratio of those polymer blocks, is preferably 25/75 to 95/5, more preferably 25/75 to 80/20. The number average molecular weight of the block copolymer for use in the present invention is within the range of 5,000 to 1,000,000, preferably 10,000 to 800,000. The molecular weight distribution, i.e., the ratio Mw/Mn, where Mw represents a weight average molecular weight and Mn represents a number average molecular weight, is 10 or less. The block copolymer may be a straight chain type, branched chain type, radial type, or any combination thereof. For example, the block copolymer comprising the vinyl aromatic compound (X) and the block-conjugate diene compound (Y) has a structure of X-Y-X, Y-X-Y-X, X-Y-X-Y-X, and the like. An unsaturated bond of the conjugate diene compound in the diene based block copolymer may be partially hydrogenated.

The vinyl aromatic compound which may be employed to form a component block of the diene based block copolymer is one or two or more selected from, for example, styrene, α-methylstyrene, vinyltoluene, p-tert-butylstyrene, divinylbenzene, p-methylstyrene, 1,1-diphenylstyrene and the like. Preferred is styrene. The conjugate diene compound is one or two or more selected from, for example, butadiene, isoprene, 1,3-pentadiene, 2,3-dimethyl-1,3-butadiene, piperylene, 3-butyl-1,3-octadiene, phenyl-1,3-butadiene and the like. Preferred are butadiene, isoprene, and a combination thereof.

Any production method can be used as long as the block copolymer has the aforementioned structure. For example, the vinyl aromatic compound-conjugate diene compound block copolymer can be produced in an inert solvent using a lithium catalyst, as described in Japanese Examined Patent Application Publication No. 40-23798, and Japanese Unexamined Patent Application Publication No. 51-33184. The partially hydrogenated block copolymer for use in the present invention can be produced by hydrogenating in an inert solvent in the presence of a hydrogenation catalyst as described in Japanese Examined Patent Application Publication Nos. 42-8704 and 43-6636, and Japanese Unexamined Patent Application Publication No. 59-133203.

The epoxidized diene based block copolymer for use in the present invention can be obtained by reacting the above-mentioned block copolymer with an epoxidation agent such as hydroperoxides and peracids in an inert solvent. Examples of the peracids include performic acid, peracetic acid, and perbenzoic acid. When hydroperoxide is used, a combination of a mixture of tungstic acid and sodium hydroxide, and hydrogen peroxide; a combination of an organic acid and hydrogen peroxide; or a combination of molybdenum hexacarbonyl and tert-butyl hydroperoxide can have a catalytic effect.

The amount of the epoxidation agent is not especially limited, and the optimal amount for each case depends on the individual epoxidation agent, a desired epoxidation degree, and variable factors of an individual block copolymer.

The resultant epoxidized diene based block copolymer can be isolated by any suitable method. For example, the epoxidized block copolymer may be precipitated in an inactive solvent; the block copolymer may be put into hot water under agitation to distil and remove the solvent; or the solvent may be directly removed from the block copolymer.

The content of the epoxy group in the epoxidized diene based block copolymer for use in the present invention can be expressed by the oxirane oxygen content. The oxirane oxygen content is 0.2% to 6% by weight, preferably 0.6% to 4.5% by weight. If the oxirane oxygen content exceeds 6% by weight, undesired gelation may be induced during processing the epoxidized diene based block copolymer, resulting in a defective appearance. On the other hand, if the oxirane oxygen content is less than 0.2% by weight, adhesiveness between the thermoplastic resin composition (A) and the coating layer may be lowered.

Thermoplastic Resin Composition (A)

The thermoplastic resin composition (A) for use in the present invention comprises the thermoplastic resin (a1) and the compound (a2) having the functional group, and specifically 85% to 97% by weight of the thermoplastic resin (a1) and 15% to 3% by weight of the compound (a2) having the functional group.

The thermoplastic resin composition for use in the present invention may contain other thermoplastic elastomers, various inorganic fillers, various additives as required, as long as the advantages of the present invention are fully provided.

Examples of the thermoplastic elastomers include diene based rubber such as polybutadiene, styrene-butadiene copolymer, polyacrylonitrile-butadien copolymer and polyisoprene, non-diene based rubber such as ethylene-α-olefine copolymer and ethylene-α-olefine-polyene copolymer, styrene-butadiene block copolymer, hydrogenated styrene-butadiene block copolymer, ethylene-propylene elastomer, stylene graft ethylene-propylene elastomer, ethylene based ionomer resin, styrene-isoprene block copolymer, and hydrogenated styrene-isoprene block copolymer. These thermoplastic elastomers can be used alone or in combination.

The thermoplastic elastomer is added in an amount of 0% to 100% by weight, preferably 1% to 50% by weight based on 100% by weight of the sum of the thermoplastic resin (a1) and the compound (a2) having the functional group with mechanical properties and heat resistance taken into consideration. If the amount of the thermoplastic elastomer exceeds 100% by weight, heat resistance tends to be decreased. Within the specified range, moldability does not decrease.

Examples of the inorganic filler include natural silica, silicic acid or silicate such as fine powder talc, kaolinite, fired clay, pyrophyllite, sericite, and wollastonite; carbonates such as precipitated calcium carbonate, heavy calcium carbonate, and magnesium carbonate; hydroxides such as aluminum hydroxide and magnesium hydroxide; oxides such as zinc oxide, zinc white, and magnesium oxide; powder fillers including synthetic silica, silicic acid or silicate such as calcium silicate hydrate, aluminum silicate hydrate and silicate hydrate; flake fillers such as mica; fiber fillers such as basic magnesium sulfate whisker, calcium titanate whisker, aluminum borate whisker, sepiolite, PMF (Processed Mineral Fiber), xonotlite, potassium titanate, ellestadite; balloon fillers such as glass balloon, and fly ash balloon; or mixtures thereof. Preferred is talc.

The amount of the inorganic filler is preferably 50% by weight or less based on 100% by weight of the sum of the thermoplastic resin (a1) and the compound (a2) having the functional group. If the amount of the inorganic filler exceeds this range, adverse effects such as poor flowability, flow marks generated on the surface of the molding, and decrease of the coating adhesiveness, which is characteristic in the present invention, occur.

The inorganic filler, especially talc, may or may not be surface-treated in advance. There are chemical or physical treatments using treating agents such as a silane coupling agent, a higher fatty acid, a metallic salt of fatty acid, an unsaturated organic acid, an organic titanate, a resin acid, and polyethyleneglycol.

According to the present invention, organic fillers such as lignin and reclaimed rubber can be used together with the inorganic fillers.

Examples of the additives include antioxidants such as a phenol based antioxidant, sulfur based antioxidant, and phosphorus based antioxidant; hydrochloric acid absorber; heat resisting stabilizers; light stabilizers; lubricants; nucleating agents such as aromatic aluminum carboxylate, aromatic phosphate, and dibenzylidene sorbitol; ultraviolet ray absorbers; antistatic agents; flame retardants; pigments, dyes; dispersants; copper inhibitors; foaming agents; and plasticizers.

The thermoplastic resin composition (A) for use in the present invention can be obtained by melt-kneading the aforementioned components using a known method.

The aforementioned components are simultaneously or successively introduced and kneaded into/in, for example, a Henschel mixer, a V type blender, a tumbler blender, or a ribbon blender, and then melt-kneaded in a single screw extruder, a multi screw extruder, a kneader, or a Banbury mixer.

Among them, the multi screw extruder, the kneader, and the Banbury mixer having excellent mixing properties can provide a high quality thermoplastic resin composition in which respective components are more uniformly dispersed, and therefore are preferred.

According to the present invention, respective components may be simultaneously mixed and kneaded to prepare the composition. Alternatively, a premixture, i.e., master batch, containing a high degree of a specific component, for example, an inorganic filler, is prepared, and then is diluted with the components (a1) and (a2) so that a desired degree of inorganic filler is contained.

Molding (M) of Thermoplastic Resin Composition (A)

The thermoplastic resin composition (A) can be molded into any shape using not only known molding methods, but also other molding methods. Preferred is an injection molding.

When the molding is made of a polyolefin based resin, the molding is wiped with a hydrophobic solvent before coating to improve adhesiveness between the molding and the coating layer. As the solvent for wiping, hydrophobic solvents such as cyclohexane, xylene, toluene, and benzene; esters such as dioctyladipate; polar solvents such as tetrahydrofuran, dimethylformamide, dimethylsulfoxide; oils such as paraffin; and the like can be used. The hydrophobic solvent such as xylene is especially preferred.

On the surface of the molding (M), low molecular weight oxidized components contained in the resin, additives such as a plasticizer, an age resistor, a surfactant, an antistatic agent, a lubricant, and a mold release agent tend to be flocculated. For this reason, the molding (M) has a lower adhesive strength on the surface than that of the inside of the molding. The wiping before coating is to remove such weak surface layers, and to form a new layer containing a compound having a functional group, such as the epoxidized diene based block copolymer, whereby adhesiveness between the molding and the coating agent is improved.

Coating Layer (B)

Any known coatings such as an acrylic resin, and a urethane resin can be applied as the coating agent (b) for forming the coating layer (B). The coating agent (b) is selected depending on the compound (a2) having the functional group reacting with the coating agent. When the compound (a2) has an epoxy group, especially, an epoxidized diene based block copolymer, photo-curing such as an ultraviolet curing urethane acrylate based resin coating is preferable.

The coating agent (b) can be coated using, for example, a dipping method, a flow coat method, or a spraying method. The coating layer (B) generally has a thickness of 1 to 30 μm, preferably 2 to 20 μm for good smoothness.

The molding (M) is coated with the coating layer (B) to provide a coated molding having excellent adhesiveness between the molding (M) and the coating layer (B). This is because the functional group of the compound (a2) reacts with the coating agent to improve the adhesiveness between the molding and the coating layer.

In order to promote the reaction between the coating agent and the compound (a2), they may be heated under appropriate conditions, e.g., temperature, and time.

Coating materials used for preparing the coating layer (B) in the present invention include coatings containing resins such as acrylic resins and urethane resins which are publicly-known. Of those, there are preferably used photo-curable urethane (meth)acrylate-based resin coatings.

The photocurable urethane(meth)acrylate-based resin coatings include, for example, (meth)acrylates which are obtained by a reaction of isocyanate compounds and polyols with (meth)acrylates having a hydroxyl group. The isocyanate compounds include hexamethylene diisocyanate, isophorone diisocyanate, tolylene diisocyanate, xylilene diisocyanate, hydrogenated xylilene diisocyanate, diphenylmethane diisocyanate, hydrogenated diphenylmethane diisocyanate, naphthalene diisocyanate, and norbornane diisocyanate, or the like. The polyols include a polyethylene glycol, a polypropylene glycol, a polytetramethylene glycol, an adduct of ethyleneoxide to bisphenol A, and an adduct of propyleneoxide to bisphenol A, polyester polyols, and polycarbonate diols, or the like. The (meth)acrylates having a hydroxyl group include 2-hydroxyethyl(meth)acrylate, 2-hydroxypropyl(meth)acrylate, 2-hydroxybutyl(meth) acrylate, a polyethyleneglycol mono(meth)acrylate, and a polypropyleneglycol mono(meth)acrylate, or the like.

To the photocurable urethane(meth)acrylate-based resin coatings used for forming the coating layer (B) in the present invention, organic solvents can be added as a diluent, whereby, coating workability can become excellent.

The diluent includes toluene, xylene, ethyl acetate, butyl acetate, and butanol, or the like, which are generally used.

In the case that the diluent is added to the resin coatings, amount of the diluent ranges in 5–95 parts by weight, preferably 10–90 parts by weight based on 100 parts by weight of total amount of the diluent and the resin coatings. In the case that the amount of the diluent is less than 5 parts by weight, viscosity becomes high in the resin coatings, resulting in that coating workability lowers. On the other hand, in the case that it exceeds 95 parts by weight, curability lowers in the resin coatings.

In the case that the photo curable urethane (meth)acrylate-based resin coatings are used for forming the coating layer (B) in the present invention, photo initiators can be usually added to the resin coatings. The photo initiators include, for example, benzophenone, 4,4-bis(diethyl amino) benzophenone, 2,4,6-trimethylbenzophenone, methylorthobenzoyl benzoate, 4-phenylbenzophenone, t-butylanthraquinone, 2-ethylanthraquinone; thioxanthones such as 2,4-diethylthioxanthone, isopropylthioxanthone, and 2,4-dichlorothioxanthone acetophenones such as diethoxyacetophenone, 2-hydroxy-2-methyl-1-phenylpropane-1-on, benzyldimethylketal, 1-hydroxycyclohexyl-phenylketone, 2-methyl-2-morpholino(4-thiomethylphenyl)propane-1-on, and 2-benzyl-2-dimethylamino-1-(4-morpholinophenyl) butanone; benzoins such as benzoin methylether, benzoin ethylether, benzoin isopropylether, and benzoin isobutylether; acylphosphine oxides such as 2,4,6-trimethyl benzoyldiphenyl phosphine oxides, bis(2,6-dimethoxybenzoyl)-2,4,4-trimethyl pentyl phosphine oxides, and bis(2,4,6-trimethylbenzoyl)phenyl phosphine oxides; methylbenzoyl formate; 1,7-bisacrydinylheptane; and 9-phenylacrydine, or the like.

The photo initiators can be employed solely or also in combination of two or more kinds.

The photo initiators are added in a range of 0.01–15 parts by weight, preferably 0.1–10 parts by weight based on 100 parts by weight of the urethane(meth)acrylate-based resin coatings.

In the case that amount of the photo initiators is less than 0.01 part by weight, photo curability remarkably lowers in the photo curable urethane(meth)acrylate-based resin coatings, resulting in that those become substantially inappropriate for industrial production. On the other hand, in the case that it exceeds 15 parts by weight and photo irradiation dose is small, odor tends to be remained in a cured layer. Although the photo initiators are usually employed in a single liquid-based composition, those may be added immediately before coating.

Further, an accelerator for the photo initiators may be even optionally added to the photo curable urethane (meth) acrylate-based resin coatings. The accelerator includes ethanolamine, diethanol amine, triethanol amine, N-methyldiethanol amine, 4-dimethylaminomethyl benzoate, 4-dimethylaminoethyl benzoate, 4-dimethylaminoamyl benzoate, and 4-dimethylaminoacetophenone, or the like.

Still further, compounds having a radically-polymerizable ethylenic unsaturated bond may be even optionally mixed with the photo curable urethane(meth)acrylate-based resin coatings. Specific examples thereof include, for example, vinyl ester monomers such as N-vinylforamide, N-vinylacetamide, N-vinyl-2-pyrrolidone, N-vinylcaprolactam, and divinyladipate; vinyl ethers such as ethylvinylether and phenylvinylether; acrylic amides such as acrylic amide, N-methylol acrylic amide, N-methoxymethyl acrylic amide, N-butoxymethyl acrylic amide, N-t-butyl acrylic amide, acryloyl morpholine, and methylenebis acrylic amide; a (meth)acrylic acid; (meth)acrylates such as methyl(meth)acrylate, ethyl(meth)acrylate, propyl(meth) acrylate, n-butyl(meth)acrylate, i-butyl(meth)acrylate, t-butyl(meth)acrylate, hexyl(meth)acrylate, 2-ethylhexyl (meth)acrylate, lauryl(meth)acrylate, stearyl(meth)acrylate, tetrahydrofurfuryl(meth)acrylate, 2-hydroxyethyl(meth) acrylate, 2-hydroxypropyl(meth)acrylate, 4-hydroxybutyl (meth)acrylate, glycidyl(meth)acrylate, dimethylaminoethyl (meth)acrylate, diethylaminoethyl (meth)acrylate, benzyl (meth)acrylate, cyclohexyl (meth)acrylate, phenoxyethyl (meth)acrylate, tricyclodecane (meth)acrylate, allyl(meth) acrylate, 2-ethoxyethyl (meth)acrylate, isobonyl(meth) acrylate, phenyl (meth)acrylate, ethyleneglycol di(meth) acrylate, diethyleneglycol di(meth)acrylate, triethyleneglycol di(meth)acrylate, tetraethyleneglycol di(meth)acrylate, 1,3-butyleneglycol di(meth)acrylate, 1,4-butanediol di(meth)acrylate, 1,6-hexanediol di(meth) acrylate, 1,9-nonanediol di(meth)acrylate, neopentylglycol di(meth)acrylate, hydroxypivalic neopentylglycol di(meth) acrylate, propyleneglycol di(meth)acrylate, dipropyleneglycol di(meth)acrylate, tripropyleneglycol di(meth)acrylate, tetrapropyleneglycol di(meth)acrylate, polypropyleneglycol di(meth)acrylate, polytetramethyleneglycol di(meth) acrylate, trimethylolpropane tri(meth)acrylate, ethoxylated trimethylolpropane tri(meth)acrylate, propoxylated trimethylolpropane tri(meth)acrylate, glycerin tri(meth)acrylate, ethoxylated glycerin tri(meth)acrylate, tris(acryloxyethyl) isocyanurate, ditrimethylolpropane tetra(meth)acrylate, pentaerythritol tri(meth)acrylate, pentaerythritol tetra(meth) acrylate, dipentaerythritol penta(meth)acrylate, and dipentaerythritol hexa(meth)acrylate, or the like.

The compounds having a radically-polymerizable ethylenic unsaturated bond may be employed solely or also in combination of two or more kinds. Of those, compounds having two or more (meth)acryloyl groups are preferably employed from a viewpoint of curability, and compounds having three or more (meth)acryloyl groups are more preferably employed.

In addition, depending upon uses, there can be appropriately added additives such as releasing agents, slipping agents, plasticizers, antioxidants, antistatic agents, photostabilizers, ultraviolet ray absorbents, flame retardants, auxiliary agents for flame retardants, polymerization inhibitors, fillers, pigments, dyes, silane coupling agents, and tackifiers which are publicly known.

In the case that the photo curable urethane (meth)acrylate-based resin coatings are used for forming the coating layer (B) in the present invention, after coating the photo curable urethane (meth)acrylate-based resin coatings on molded articles, coating layer can be formed on surface of the molded articles by irradiation of an active energy ray.

As coating methods onto the molded articles, there can be applied publicly known methods such as a bar-coater method, a curtain flow-coating method, a roll-coating method, a spin-coating method, and a dipping method, or the like.

As kinds of the active energy ray for irradiating radiation rays onto the photo curable urethane (meth)acrylate-based resin coatings, an electron beam, an ultraviolet ray, and visible light can be applied and, of those, the ultraviolet ray is preferably employed from a viewpoint of apparatus costs and productivity. Further, as irradiation sources, there are appropriate a carbon arc lamp, a xenon lamp, an ultrahigh pressure mercury lamp, a high pressure mercury lamp, a middle pressure mercury lamp, a low pressure mercury lamp, a metal halide lamp, and a high frequency induction mercury lamp, or the like. It is to be noted that an atmosphere in the case of irradiating the active energy ray may be even any one of air, nitrogen, or an inert gas such as argon.

Conditions for irradiation are as follows.

For example, in the case that the high pressure mercury lamp is employed, irradiation is conducted at intensity of 50–200 W/cm, preferably 80–150 W/cm, and more preferably 120 W/cm or so after drying coating layer at 50–120° C. for 5–20 minutes. Irradiation period is 1–10 seconds, preferably 3–8 seconds, and more preferably 5 seconds or so, which depends upon kind of irradiation sources, distance between an irradiation source and coated layer, and other conditions.

A cured coating layer thus-obtained has thickness of 5–50 $\mu$m, and preferably 20 $\mu$m or so.

In the case that irradiation is conducted by an electron beam, there is employed an irradiation source having energy of 50–1000 KeV, and irradiation dose is preferably 2–5 Mrad. Usually, there is employed an irradiation source having lamp intensity of 80–300 W/cm.

After irradiation, curing can be also accelerated by optionally heating.

Other features of this invention will become apparent in the course of the following description of exemplary embodiments, which are given for illustration of the invention and are not intended to be limiting thereof.

The components used in the following Examples and Comparative Examples are as follows.

(1) Thermoplastic Resin (a1)

a1-1 . . . Propylene homopolymer "H501" having a melt flow rate (MFR) of 3 g/10 minutes made by Sumitomo Chemical Co., Ltd.;

a1-2 . . . Polypropylene block copolymer "J708" having a MFR of 45 g/10 minutes made by Grand Polymer Inc., Co., Ltd.; and a1-3 . . . Polyethylene "Petrocene 203" having a MFR of 15 g/10 minutes made by TOSOH CORPORATION.

(2) Compound (a2) having a Functional Group

Preparation Example 1

Preparation of a2-1: 300 g of styrene-butadiene-styrene block copolymer ("TR-2000" made by JSR Corporation; a weight ratio of styrene to butadiene is 40/60) and 1,500 g of ethyl acetate were introduced into a reactor having a jacket equipped with an agitator, a reflux condenser, and a thermometer, and dissolved therein. 165 g of ethyl acetate solution containing 30% by weight of peracetic acid was continuously added dropwise to epoxidize the mixture at 40° C. for 3 hours with agitation. The reaction liquid was taken out at room temperature, and a large amount of methanol was added thereto to precipitate the polymer, which was filtered, washed with water, and dried. Thus, the epoxidized diene based block copolymer (a2-1) having 3.0% by weight of oxirane oxygen content was obtained.

Preparation Example 2

Preparation of a2-2: 600 g of styrene-butadiene-styrene block copolymer ("Asaflex 810" made by Asahi Chemical Industry Co., Ltd.; a weight ratio of styrene to butadiene is 70/30) and 1,800 g of ethyl acetate were introduced into a reactor having a jacket equipped with an agitator, a reflux condenser, and a thermometer, and dissolved therein. 150 g of ethyl acetate solution containing 30% by weight of peracetic acid was continuously added dropwise to epoxidize the mixture at 40° C. for 3 hours with agitation. The reaction liquid was taken out at room temperature, and a large amount of methanol was added thereto to precipitate the polymer, which was filtered, washed with water, and dried. Thus, the epoxidized diene based block copolymer (a2-2) having 2.0% by weight of oxirane oxygen content was obtained.

(3) Other Thermoplastic Elastomer

D1: Styrene butadiene block copolymer "TR-2000" made by JSR Corporation;

D2: Hydrogenated styrene butadiene block copolymer "Clayton G1657" made by Shell Chemical, Co., Ltd.

(4) Inorganic Filler: Talc "Micelletone" Having an Average Particle Size of 1.4 $\mu$m Made by Hayashi Kasei Co., Ltd.

EXAMPLES 1 TO 11

The above-described components in a ratio listed in Table 1 were mixed in a Henschel mixer, and then kneaded in a twin-screw extruder at 230° C. to provide respective thermoplastic resin compositions. Each of the thermoplastic resin compositions was molded using an injection molding machine at a cylinder temperature of 230° C., and at a die temperature of 40° C. into a test piece having a size of 80 mm×15 mm×2 mm for a coating adhesiveness test. Some test pieces were wiped with a cyclohexane solvent, and then tested for adhesiveness of the coating layer described below. The rest of the test pieces were not wiped, and tested similarly. Table 1 shows the results.

Comparative Examples 1 to 6

The above-described components in a ratio listed in Table 2 were mixed in a Henschel mixer, and then kneaded in a twin-screw extruder at 230° C. to provide respective thermoplastic resin compositions. Each of the thermoplastic resin compositions was molded using an injection molding machine at a cylinder temperature of 230° C., and at a die temperature of 40° C. into a test piece having a size of 80 mm×15 mm×2 mm for a coating adhesiveness test. Respective test pieces were wiped with a cyclohexane solvent, and then tested for adhesiveness of the coating layer described below. Table 2 shows the results.

Evaluation of Various Properties (1) Evaluation of coating property (adhesiveness):

Each test piece was coated with a coating agent containing 1 part by weight of a tackifier "Diabeam UK5225" (made by Mitsubishi Rayon Co., Ltd.) based 100 parts by weight of a urethane acrylate-based coating agent "Diabeam UL1192" (nonvolatile components of 25%, specific gravity of 0.93, made by Mitsubishi Rayon Co., Ltd.) in a dry coating thickness of 10 to 20 $\mu$m, dried at 60° C. for 15 minutes, and then cured by once irradiating in a conveyer speed of 3 m/minute with an ultraviolet ray irradiated from a high pressure mercury lamp (120 W/cm).

It is to be noted that the coating agent was prepared by mixing the tackifier with the urethane acrylate-based coating agent for 1 minute at 25° C. After allowing to stand for 48 hours at 25° C., adhesiveness between the coating layer and the molding was evaluated using a cross-cut adhesion test by the Japanese Industrial Standard (JIS). The results are also shown in Tables 1 and 2 by "A", "B", "C". "A" means that the coating layer was never peeled. "B" means that the coating layer was partly peeled. "C" means that the coating layer was completely peeled.

(2) Coating property (hot water resistance): After each test piece was immersed in hot water at 50° C. for 24 hours, adhesiveness between the coating layer and the molding was evaluated using the above-mentioned cross-hatched adhesion test by JIS. The results are shown in Tables 1 and 2 by "A", "B", "C" as defined above.

(3) Appearance: Each test piece was visually inspected for a flow mark. A flow mark is a stripe mark generated vertically on an injection pass. The results are shown in Tables 1 and 2 by "A" and "C". "A" means that no flow mark was generated. "C" means that a flow mark or flow marks were generated.

TABLE 1

| Example | 1 | 2 | 3 | 4 | 5 | 6 | 7 | 8 | 9 | 10 | 11 |
|---|---|---|---|---|---|---|---|---|---|---|---|
| Components (parts by weight) Thermoplastic resin (a1) | | | | | | | | | | | |
| a1-1 polypropylene homopolymer | 90 | — | — | — | — | — | — | — | — | — | — |
| a1-2 polypropylene block copolymer | — | 90 | — | 95 | 97 | 85 | 90 | 90 | 90 | 95 | 90 |
| a1-3 polyethylene | — | — | 90 | — | — | — | — | — | — | — | — |
| Compound having a functional group (a2) | | | | | | | | | | | |
| a2-1 epoxidized diene based block copolymer | 10 | 10 | 10 | 5 | 3 | 15 | — | 10 | 10 | 5 | 10 |
| a2-2 epoxidized diene based block copolymer | — | — | — | — | — | — | 10 | — | — | — | — |
| Other thermoplastic elastomer | | | | | | | | | | | |
| D1 | — | — | — | — | — | — | — | 10 | — | — | — |
| Inorganic filler (talc) | — | — | — | — | — | — | — | — | 10 | — | — |
| Cyclohexane wiping | done | done | done | done | done | done | done | done | done | not done | not done |
| Evaluation results | | | | | | | | | | | |
| Coating property (adhesiveness) | A | A | A | A | A | A | A | A | A | B | B |
| Coating property (hot water resistance) | A | A | A | A | A | A | A | A | A | B | B |
| Appearance | A | A | A | A | A | A | A | A | A | A | A |

TABLE 2

| Comparative Example | 1 | 2 | 3 | 4 | 5 | 6 |
|---|---|---|---|---|---|---|
| Components (parts by weight) Thermoplastic resin (a1) | | | | | | |
| a1-1 polypropylene homopolymer | 90 | — | — | 90 | — | — |
| a1-2 polypropylene block copolymer | — | 90 | — | — | 90 | — |
| a1-3 polyethylene | — | — | 90 | — | — | 90 |
| Other thermoplastic elastomer | | | | | | |
| D1 | 10 | 10 | 10 | — | — | — |
| D2 | — | — | — | 10 | 10 | 10 |
| Cyclohexane wiping | done | done | done | done | done | done |
| Evaluation results | | | | | | |
| Coating property (adhesiveness) | B | C | B | C | C | C |
| Coating property (hot water resistance) | C | C | C | C | C | C |
| Appearance | C | C | C | A | A | A |

According to the present invention, such a coated molding where a firmly adhered coating layer is formed on the surface of a thermoplastic resin composition molding is provided without requiring any complex surface treatments. The coated molding of the present invention is suitable for industrial materials including automobile parts, household electric appliance parts, and electrical equipment parts, and other commodities.

What is claimed is:

1. A coated molding comprising:
   a molding (M) of a thermoplastic resin composition (A) including a thermoplastic resin (a1) and a compound (a2) which is an epoxidized diene based block copolymer obtained by epoxidizing a diene based block copolymer or a partially hydrogenated diene based block copolymer, wherein prior to epoxidizing, said diene based block copolymer or partially hydrogenated diene based block copolymer consists of a polymer block consisting of a vinyl aromatic hydrocarbon compound, and a polymer block consisting of a conjugate diene compound or a partially hydrogenated conjugate diene compound, and
   a coating layer (B) on a surface of the molding (M), wherein said coating layer is a cured reaction product of a photo-curable urethane acrylate based coating agent (b).

2. A coated molding according to claim 1, wherein the thermoplastic resin composition (A) comprises 85% to 97% by weight of the thermoplastic resin (a1) and 15% to 3% by weight of the compound (a2).

3. A coated molding according to claim 1, wherein the thermoplastic resin (a1) is a polyolefin based resin.

4. A coated molding according to claim 3, wherein the polyolefin based resin is a polypropylene based resin and/or a polyethylene based resin.

5. A method for producing a coated molding according to any one of claims 1 to 4 comprising the steps of:
   coating a surface of the molding (M) with the coating agent (b), and
   reacting the compound (a2) with the coating agent (b) to form the coating layer (B) thereon.

6. A method for producing a coated molding according to claim 5, wherein the coating agent (b) is coated after the surface of the molding is treated with a hydrophobic solvent.

7. A method for producing a coated molding according to claim 6, wherein the hydrophobic solvent is one or more selected from the group consisting of xylene, cyclohexane, and toluene.

* * * * *